B. V. NORDBERG.
MOTOR COMPRESSOR.
APPLICATION FILED JUNE 18, 1909.
978,194.
Patented Dec. 13, 1910.
4 SHEETS—SHEET 1.
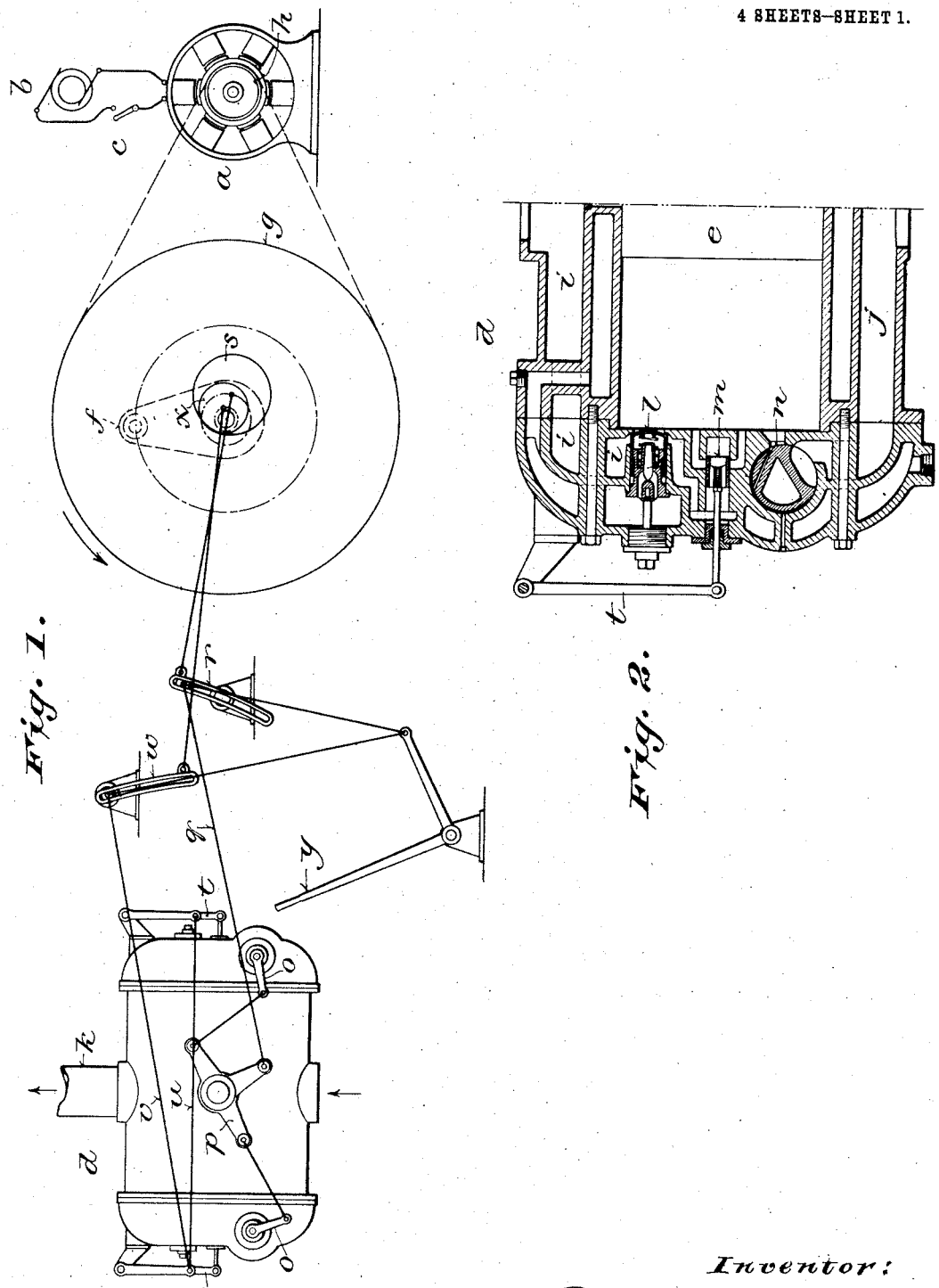

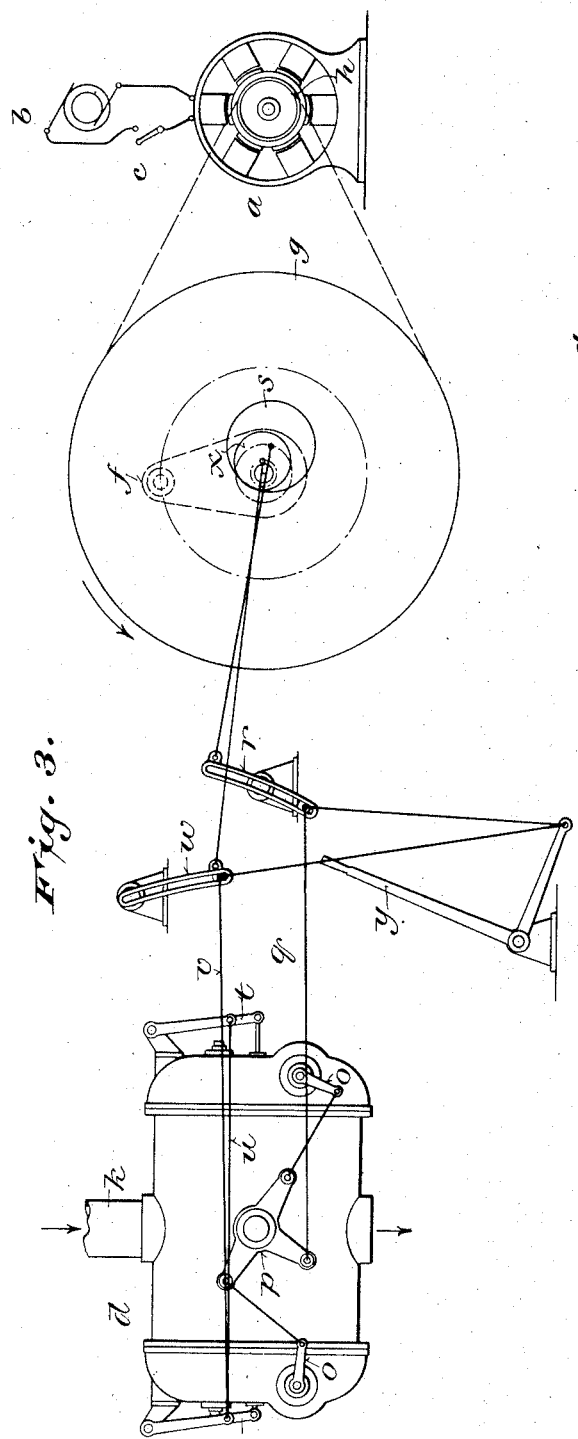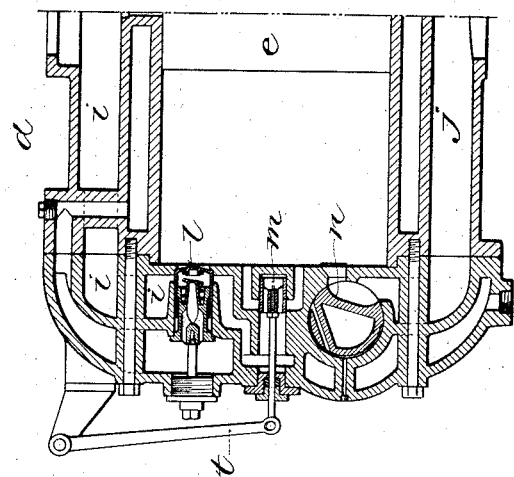

B. V. NORDBERG.
MOTOR COMPRESSOR.
APPLICATION FILED JUNE 18, 1909.
978,194.
Patented Dec. 13, 1910.
4 SHEETS—SHEET 3.
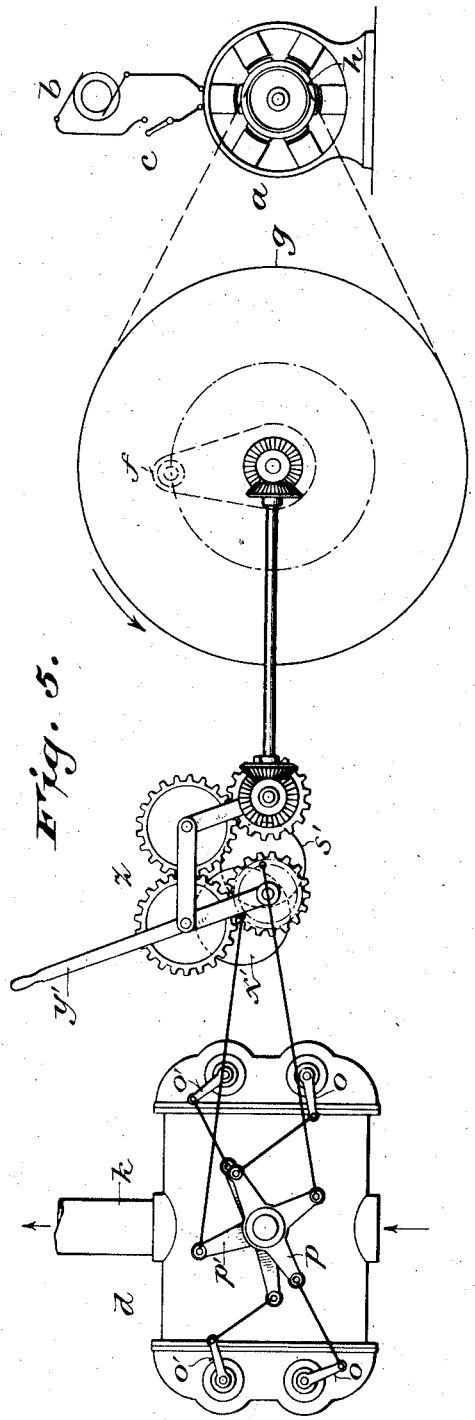
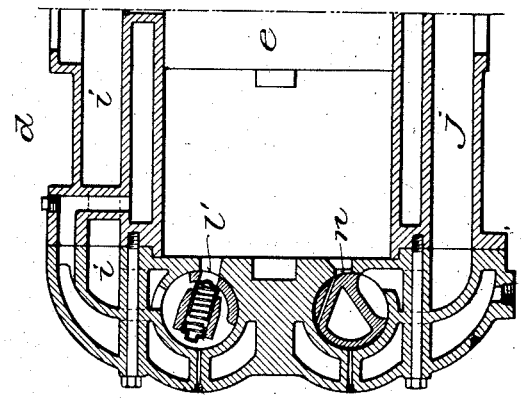
Witnesses:
Inventor:

B. V. NORDBERG.
MOTOR COMPRESSOR.
APPLICATION FILED JUNE 18, 1909.
978,194.
Patented Dec. 13, 1910.
4 SHEETS—SHEET 4.
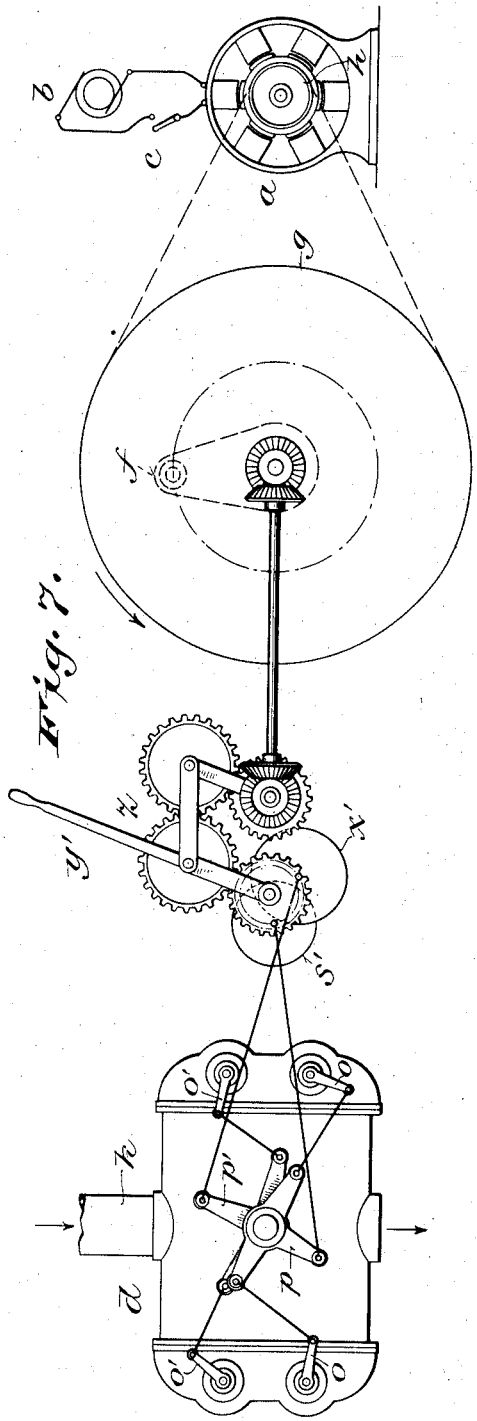
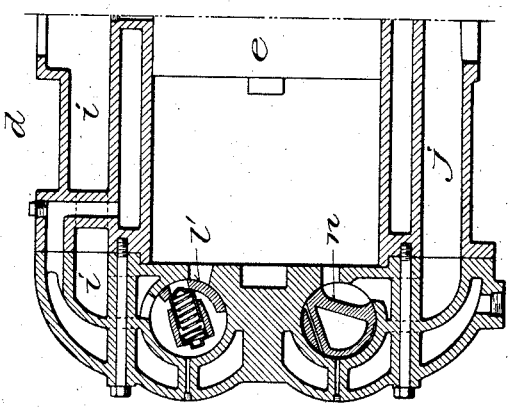
Witnesses:
Fred Palm
Chas. L. Goss.
Inventor:
Bruno V. Nordberg,
By Winkler Flanders Bottum & Howsett
Attorneys.

UNITED STATES PATENT OFFICE.

BRUNO V. NORDBERG, OF MILWAUKEE, WISCONSIN.

MOTOR-COMPRESSOR.

978,194.  Specification of Letters Patent.  Patented Dec. 13, 1910.

Application filed June 18, 1909. Serial No. 502,859.

*To all whom it may concern:*

Be it known that I, BRUNO V. NORDBERG, a citizen of the United States, residing at Milwaukee, in the county of Milwaukee and State of Wisconsin, have invented certain new and useful Improvements in Motor-Compressors, of which the following is a specification, reference being had to the accompanying drawing, forming a part thereof.

This invention relates more particularly to compressors driven by synchronous electric motors. Its main object is to utilize the compressor as an engine where a reserve supply of compressed air is available to bring the motor to synchronism with its alternator in starting.

It consists in the construction, arrangement and combination of parts or elements as hereinafter particularly described and pointed out in the claims.

In the accompanying drawing like characters designate the same parts in the several figures.

Figure 1 is a diagrammatic side elevation of a motor-compressor embodying the invention; Fig. 2 is an enlarged central longitudinal section of one end of the compressed air engine forming a part of the apparatus, Figs. 1 and 2 showing the valve mechanism for the operation of the engine as a compressor; Fig. 3 is a diagrammatic elevation similar to Fig. 1, and Fig. 4 a section similar to Fig. 2 showing the valve mechanism for the operation of the engine as a motor; Fig. 5 is a diagrammatic elevation similar to Figs. 1 and 3 showing a modification of the apparatus in which the engine is adjusted to operate as a compressor; Fig. 6 is an enlarged vertical medial section of one end of the cylinder showing the arrangement of the engine valves corresponding with the adjustment of the valve mechanism shown in Fig. 5; Fig. 7 is a diagrammatic elevation similar to Fig. 5 showing the valve mechanism adjusted for the operation of the engine as a motor; and Fig. 8 is a section corresponding with Fig. 6 but showing an arrangement of the engine valves corresponding with the adjustment of the valve mechanism shown in Fig. 7.

Referring to Figs. 1 to 4 inclusive, $a$ designates a synchronous electric motor, and $b$ an alternator for actuating the same, a switch $c$ being provided in the circuit for turning the current on and off. $d$ is a compressed air engine convertible by adjustment of the valve mechanism into either a compressor or motor. The piston $e$ of the engine is connected in the usual way with the crank $f$ of the driving shaft with which the rotor of the motor $a$ is connected by a belt and pulleys $g$ and $h$ in the usual or any suitable manner. The cylinder of the engine is formed or provided with passages $i$ and $j$, the passage $i$ being connected with a compressed air tank or reservoir which may consist in some cases of a pipe $k$ or system of piping. The passage $j$ communicates directly or indirectly with the atmosphere, or with an intercooler in multistage pumps, serving either as an inlet passage when the engine operates as a compressor, or an outlet when the engine operates as a motor. At each end the cylinder is provided with an automatic discharge valve $l$, and a separate admission valve $m$ controlling ports opening from the cylinder into the passage $i$ and from said passage into the cylinder respectively. It is also provided at each end with a reversible valve $n$ controlling a port leading from the passage $j$ into the cylinder, or vice versa. These valves may be of any form or type suitable for performing the required functions of admission and exhaust as well as of suction and discharge. The valves $m$ in the present case are of the piston type, while the valves $n$ are of the rotative type, and both are positively actuated by connections with the crank shaft or other suitable part or parts of the engine. In the present case the valves $n$ are provided at one end with arms $o$ which are connected by links with a wrist plate or rocker $p$. This wrist plate or rocker is connected by a rod $q$ with a rocker arm $r$ which is in turn connected with and actuated by an eccentric $s$ on the crank shaft. The rod $q$ has a sliding connection with the rocker arm $r$ so as to reverse the action of the valves $n$ relative to the movement of the piston $e$.

The stems of the valves $m$ projecting outwardly through stuffing boxes in the cylinder heads, are connected with levers $t$, which are in turn connected with each other by a rod $u$ so as to operate in unison. One of the levers $t$ is connected by a rod $v$ with a rocker arm $w$ which is in turn connected with and actuated by an eccentric $x$ on the crank shaft. The rod $v$ has a sliding connection with the arm $w$ so that the valves $m$ may be rendered inactive and set, as shown in Fig. 2, to close the associated cylinder ports by shifting the connection of the rod $v$ with the arm $w$ to a point opposite the fulcrum on which said arm swings, as shown in Fig. 1. The rods $q$ and $v$ adjacent to their sliding connections with the rocker arms $r$ and $w$, are connected by rods with a hand lever $y$ whereby they are shifted so as to render the valves $m$ active or inactive, and at the same time reverse the action of the valves $n$.

With this form and arrangement of apparatus, when the valve gear is set as shown in Figs. 1 and 2, the engine $d$ is driven by the motor $a$ and operates as a compressor, the valves $m$ remaining inactive and closing the associated ports opening from the passage $i$ into the cylinder, and the valves $n$ acting as suction valves to admit atmospheric air into the cylinder while the air compressed in the cylinder by the action of the piston $e$ is discharged in the usual manner through the valves $l$ into the pressure chest or passage $i$.

In starting the engine, to bring the motor $a$ by which it is normally driven as a compressor, into synchronism with the generator or alternator $b$ by which it is normally actuated, the lever $y$ is turned to the right as shown in Fig. 3, thereby bringing the valves $m$ into action and reversing the action of the valves $n$. The engine is thus converted into a motor, compressed air being admitted into the cylinder from the passage $i$ by the valves $m$ and exhausted therefrom through the valves $n$ and passage $j$. The rotor of the motor $a$ is thus turned by the compressed air engine acting as a motor, in the same direction as indicated by arrows on the drawing, that it is turned when it drives the engine operating as a compressor. When the speed of the motor as determined by a speed indicator, is brought to synchronism with that of the generator or alternator $b$, the circuit is closed by the switch $c$ and the lever $y$ is returned to its original position, as shown in Fig. 1, thereby causing the engine $d$ to resume its normal operation as a compressor.

As hereinbefore stated, various forms or types of valves and different arrangements of valve gear may be employed to attain the same end. For example, in place of the discharge valves $l$ and separate admission valves $m$ shown in Figs. 2 and 4, reversible rotative valves $l'$ may be used, as shown in Figs. 5 to 8 inclusive, such valves adapted to perform the functions of both discharge and admission valves. Like the valves $n$ the valves $l'$ are positively actuated, and to this end are provided at one end with arms $o'$ which are connected by links with a wrist plate or rocker $p'$. The wrist plate or rocker $p$ in this case is connected with and actuated by an eccentric $s'$, and the wrist plate or rocker $p'$ is connected with and actuated by an eccentric $x'$ which is fixed with the eccentric $s'$ on a shaft driven from the crank shaft of the engine through reversing gear $z$, which is adjusted by means of a hand lever $y'$. When the reversing gear is set as shown in Fig. 5, the engine $d$ is driven by the motor $a$, and operates as a compressor, the valves $l'$ acting as discharge valves, and the valves $n$ as suction valves.

To start the engine and bring the motor $a$ from a state of rest up to a speed synchronous with that of the generator $b$ by which it is actuated, the operation of the valves $l'$ and $n$ is reversed by turning the lever $y'$ to the right, as shown in Fig. 7. This converts the engine from a compressor into a motor, the valves $l'$ now acting as admission valves, and the valves $n$ as exhaust valves. The rotor of the motor $a$ is thus turned by the engine in the same direction that it turns when it drives the engine operating as a compressor, as indicated by arrows, and when it is brought up to a speed synchronous with that of the generator or alternator $b$, the circuit is closed by the switch $c$ and the lever $y'$ is turned back to the left into its original position, thereby causing the engine to resume its normal operation as a compressor.

With apparatus so constructed and arranged, where a reserve supply of compressed air is available, extra motors or other expedients commonly resorted to for bringing synchronous motors up to the required speed in starting, are dispensed with, and the expense of installation and maintenance of a synchronous motor-driven air compressing plant is reduced, and the operation of such a plant is materially simplified and facilitated.

Various changes in details of construction and arrangement of parts may be made without departing from the principle and intended scope of the invention.

I claim:

1. In a motor-compressor the combination of an alternator, a synchronous motor, and an engine provided with means for converting it from a compressor into a motor and vice versa, and having a power transmitting connection with said synchronous motor.

2. In a motor-compressor the combination with an alternator and a synchronous motor, of an engine connected with said motor and provided with valves and means for reversing said valves whereby they are caused to function either as suction valves or as exhaust valves.

3. In a motor-compressor the combination with a synchronous motor, an alternator for actuating the same and a compressed air reservoir, of an engine connected with said reservoir and with said motor and having valves adapted to discharge air into said reservoir and to admit air therefrom into the engine, and means for adjusting said valves so as to enable the engine to operate either as a compressor or as a motor.

4. In a motor-compressor the combination with a synchronous electric motor, an alternator for actuating the same and a compressed air reservoir, of an engine connected with said motor and provided with valves adapted to discharge air into said reservoir and to admit air therefrom into the engine, means for setting said valves so as to enable the engine to operate as a compressor or as a motor, reversible valves capable of acting as suction or as exhaust valves, and means for reversing said valves.

5. In a motor compressor the combination with a synchronous motor, an alternator for actuating the same, and a compressed air reservoir, of a compressed air engine provided with valve mechanism and means for setting said mechanism for compressing and discharging air into said reservoir or for admitting air therefrom to drive the engine and bring the electric motor to synchronism with the alternator in starting.

6. In a motor-compressor the combination with a synchronous motor, an alternator for actuating the same, and a compressed air reservoir, of an engine connected with said motor and provided with automatic compressor-discharge valves, and separate motor-admission valves controlling ports or passages between the engine and said reservoir, and means for rendering said admission valves inactive in position to close the ports or passages which they control.

7. In a motor-compressor the combination with a synchronous motor, an alternator for actuating the same and a compressed air reservoir, of an engine connected with said motor and provided with automatic compressor-discharge valves and separate motor-admission valves controlling ports or passages between the engine and said reservoir, means for rendering said admission valves inactive in position to close the ports or passages which they control, reversible suction and exhaust valves and means for reversing said valves to convert the engine from a compressor into a motor and vice versa.

In witness whereof I hereto affix my signature in presence of two witnesses.

BRUNO V. NORDBERG.

Witnesses:
  Chas. L. Goss,
  August Meissner.